United States Patent
Zhou et al.

(10) Patent No.: US 11,123,826 B1
(45) Date of Patent: Sep. 21, 2021

(54) ELECTROMAGNETIC APPARATUS FOR ACTIVE INTERVENTION TO SHAPE OF MOLTEN POOL

(71) Applicant: JIANGSU UNIVERSITY, Zhenjiang (CN)

(72) Inventors: Jianzhong Zhou, Zhenjiang (CN); Kun Huo, Zhenjiang (CN); Fengze Dai, Zhenjiang (CN); Xiankai Meng, Zhenjiang (CN); Pengfei Li, Zhenjiang (CN); Shu Huang, Zhenjiang (CN); Jinzhong Lu, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 0 days.

(21) Appl. No.: 17/257,337

(22) PCT Filed: Apr. 28, 2020

(86) PCT No.: PCT/CN2020/087567
§ 371 (c)(1),
(2) Date: Dec. 31, 2020

(30) Foreign Application Priority Data

Mar. 11, 2020 (CN) .......................... 202010166323.3

(51) Int. Cl.
*B23K 37/06* (2006.01)
*B23K 37/04* (2006.01)
*B23K 26/34* (2014.01)

(52) U.S. Cl.
CPC .......... *B23K 37/06* (2013.01); *B23K 37/0461* (2013.01); *B23K 26/34* (2013.01)

(58) Field of Classification Search
CPC ........ B23K 26/21; B23K 26/702; B23K 9/08; B23K 31/02; C23C 24/103; H01F 5/00
See application file for complete search history.

(56) References Cited

U.S. PATENT DOCUMENTS

| | | | |
|---|---|---|---|
| 4,190,760 A * | 2/1980 | Kano ....................... | B23K 9/08 219/123 |
| 5,932,121 A * | 8/1999 | Manabe ................... | B23K 9/08 219/123 |
| 2017/0106477 A1* | 4/2017 | Mironets .............. | B23K 26/702 |

(Continued)

FOREIGN PATENT DOCUMENTS

| CN | 202993889 U | 6/2013 |
|---|---|---|
| CN | 105522153 A | 4/2016 |
| CN | 207155006 U | 3/2018 |

(Continued)

*Primary Examiner* — Dana Ross
*Assistant Examiner* — Joe E Mills, Jr.
(74) *Attorney, Agent, or Firm* — Bayramoglu Law Offices LLC

(57) ABSTRACT

An electromagnetic apparatus for active intervention to a shape of a molten pool is provided. In the present invention, a workpiece is placed on stepped surfaces of a test bench. Upon power on, a metal rod rotates to generate a toroidal magnetic field centered on the metal rod, and the toroidal magnetic field acts on the molten pool to generate an induced current. The induced current generates Lorentz force under the action of the magnetic field, which acts perpendicularly on an outer surface of the molten pool, thereby changing the height, depth and width of the molten pool, and finally realizing the active intervention to the molten pool shape.

6 Claims, 5 Drawing Sheets

(56) References Cited

U.S. PATENT DOCUMENTS

2018/0050426 A1* 2/2018 Sigl ..................... B23K 26/348

FOREIGN PATENT DOCUMENTS

| CN | 108247226 A | 7/2018 |
| CN | 109128502 A | 1/2019 |
| CN | 109648215 A | 4/2019 |
| JP | 2011224628 A | 11/2011 |

* cited by examiner

ELECTROMAGNETIC APPARATUS FOR ACTIVE INTERVENTION TO SHAPE OF MOLTEN POOL

CROSS REFERENCE TO THE RELATED APPLICATIONS

This application is the national phase entry of International Application No. PCT/CN2020/087567, filed on Apr. 28, 2020, which is based upon and claims priority to Chinese Patent Application No. 202010166323.3, filed on Mar. 11, 2020, the entire contents of which are incorporated herein by reference.

TECHNICAL FIELD

The present invention relates to a special laser processing technology which is applied in the special processing fields such as laser cladding, laser welding, laser melt injection and laser melting, and specifically relates to an electromagnetic apparatus for active intervention to a shape of a molten pool.

BACKGROUND

Special processing technologies, such as laser cladding, laser welding and laser melt injection, are the process of melting localized metals with high energy input to achieve subsequent production targets. Inevitably, a molten pool is generated during processing. In the case of laser cladding, an excessively large and deep molten pool results in a high dilution rate of the cladding layer, which affects the quality of the cladding layer. Besides, the unsatisfactory bonding strength of the coating to the substrate is formed due to the small aspect ratio of the molten pool. Conventional control of the molten pool shape is generally limited to the adjustment of process parameters, but the optimization of parameters always comes at a lower powder feed rate, smaller laser power, and faster scanning speed, which greatly limits the range of processes for exploring high-quality coatings and results in unsatisfactory effects.

SUMMARY

To address the above-mentioned shortcomings, the present invention provides an electromagnetic apparatus for active intervention to a shape of a molten pool, which allows the overall control on the molten pool shape regardless of process parameters.

The electromagnetic apparatus for active intervention to a shape of a molten pool according to the present invention consists of a test bench, metal rings, conductive bolts, nuts, spacers, a motor, elastic metal sheets and a metal rod, wherein each of the metal rings is fixed to the insulated test bench by a respective one of the conductive bolts, a respective one of the nuts and a respective one of the spacers, and an end of each of the conductive bolts penetrates one side of the test bench and serves as an external conductive interface; the metal rod has an axial center located on the same vertical line as centers of the two metal rings, and is connected to the motor; the motor is located at a bottom of the test bench, and has a center located on the same vertical line as the centers of the metal rings; the metal rod comes in contact with each of the upper metal ring and the lower metal ring through a respective one of the two elastic metal sheets at both ends; an external AC power source is connected to the ends of the conductive bolts by double U-shaped wires, forming a whole closed circuit; two stepped surfaces are milled symmetrically on an upper surface of the test bench, and a workpiece is placed horizontally on the two stepped surfaces for electromagnetic intervention processing.

Upon power on, the metal rod rotates to generate a toroidal magnetic field centered on the metal rod, and the toroidal magnetic field acts on the molten pool to generate an induced current. The induced current generates Lorentz force under the action of the magnetic field, which acts perpendicularly on an outer surface of the molten pool, thereby changing the height, depth and width of the molten pool, and finally realizing the active intervention to the molten pool shape.

The electromagnetic apparatus for active intervention to a shape of a molten pool can be widely used in special processing occasions where local micro-melting occurs, such as laser cladding, laser welding, laser melt injection and laser melting.

The principle of the present invention in the case of laser cladding is illustrated in detail, which is substantially similar to the principle of action on molten pools formed in other special processing processes. The conductive metal rod is installed on the micro-motor and rotates in both of the upper and the lower metal rings which are parallel to each other at a rotational speed of 3,000 r/min. The external AC power source can provide an alternating current of 0-1,000 A and 50 HZ. The metal rod comes in electrical contact with each of the metal rings through the respective one of the two elastic metal sheets at both ends, forming the whole closed circuit. FIG. 5 shows the distribution of Lorentz forces in the cross section and longitudinal section when the metal rod is located directly below the molten pool. In 0-½ cycle, the metal rod generates a toroidal magnetic field centered on the metal rod and continuously diffusing outwards, which is counterclockwise in the front view of the molten pool, as shown in FIG. 5 (a). It is known from Lenz's law that a closed induced current must be generated in the molten pool to hinder the magnetic field generated by the metal rod. Therefore, according to the right hand rule and the skin effect, the induced current is mainly distributed on the outer surface of the molten pool, and the induced magnetic field generated by the induced current is in the opposite direction to the externally applied magnetic field, which plays a role of counteracting a part of the applied magnetic field. The molten pool can be divided vertically into numerous longitudinal sections (as shown in FIG. 5 (b)) in the directions horizontally parallel to the metal rod, and the distribution of the induced current is consistent in each of the longitudinal sections. Lorentz force is generated by the induced current under the action of the magnetic field, and by the left hand rule, the direction of the Lorentz force can be judged to be inward and perpendicular to the outer contour of the longitudinal section of the molten pool. Therefore, it can be seen by combining all of the longitudinal sections that the entire outer surface of the molten pool is subject to an inward compression Lorentz force. Similarly, it can be judged that in ½ to 1 cycle, Lorentz force with the same magnitude and direction is generated on the entire outer surface of the molten pool. For the convenience of description, FIG. 5 only shows the special case in which the metal rod is located directly below the melt channel. In fact, the metal rod rotates at a rotational speed of 3,000 r/min, so it can be understood that in the cladding process, the metal rod is always present at the bottom of the molten pool, and therefore each longitudinal section of the molten pool that is horizontally parallel to the metal rod at this time is subject to Lorentz force distributed similarly to FIG. 5. Therefore, no matter where the melt channel is, the molten pool is subject to an inward compression Lorentz force perpendicular to the outer surface. Under this action, the height and depth of the molten pool are reduced significantly, while the width is increased. By changing the alternating current, the magnitude of the toroidal magnetic field generated by the metal rod can be controlled, and the magnitude of the induced current generated in the molten pool is further affected, thereby realizing the control of the Lorentz force on the surface of the molten pool. However, no matter how the magnitude of the Lorentz force changes, its direction remains inward and perpendicular to the outer surface of the molten pool, thereby achieving the active intervention to the height, depth and width of the molten pool, and ultimately, the control of the molten pool shape.

The shape of the molten pool is fixed, but the direction of cutting the molten pool perpendicularly is changing, which remains parallel to the direction of the metal rod at the bottom of the molten pool at this time. The distance between the metal rod and the molten pool will affect the compression effect of the molten pool, but cannot be limited by the present invention as specific workpieces are different in shape and processing position. However, the shortcomings caused by the distance can be compensated by increasing the current.

Beneficial Effects

1. In the present invention, by adjusting the magnitude of the alternating current, the molten pool shape can be adjusted arbitrarily for various applications; 2. The present invention eliminates the limitation of molten pool shape on process parameters, thereby making the molten pool shape an independently controllable factor, and providing a larger range for the optimization of special processing parameters; 3. The magnitude of the alternating current can be adjusted in real time to achieve the continuous adjustment of the processing range of the special processing in different working conditions without changing the process parameters; 4. In the case of laser cladding, the control of the molten pool shape is beneficial to reduce the dilution rate of the coating and increase the aspect ratio of the molten pool to improve the bonding strength between the coating and the substrate; 5. In the case of laser welding, the control of the molten pool shape can greatly reduce the depth of the molten pool and avoid weld penetration, which is extremely important for micro-welding in small precision parts; and 6. In the case of laser melting, an increase in the width of the molten pool is helpful to expand the single melting area, which greatly increases the working efficiency.

Figure 1:
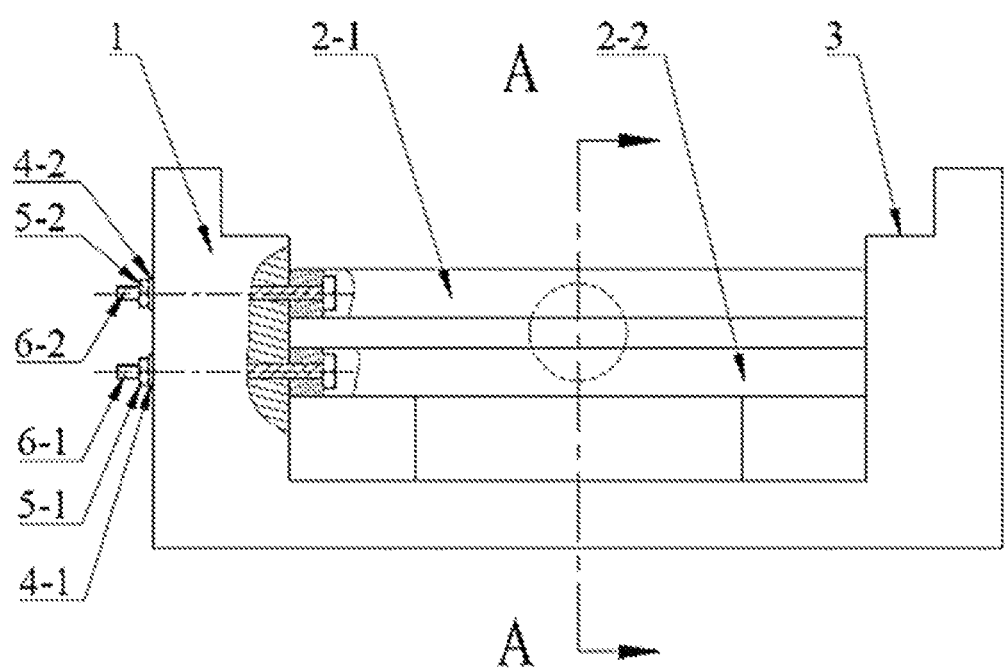
FIG. 1: A front view of an electromagnetic apparatus for active intervention to a shape of a molten pool.

In the drawing, 1 test bench; 2-1, 2-2 metal ring; 3 stepped surface; 4-1, 4-2 spacer: 5-1, 5-2 nut; 6-1, 6-2 conductive bolt.

Figure 2:
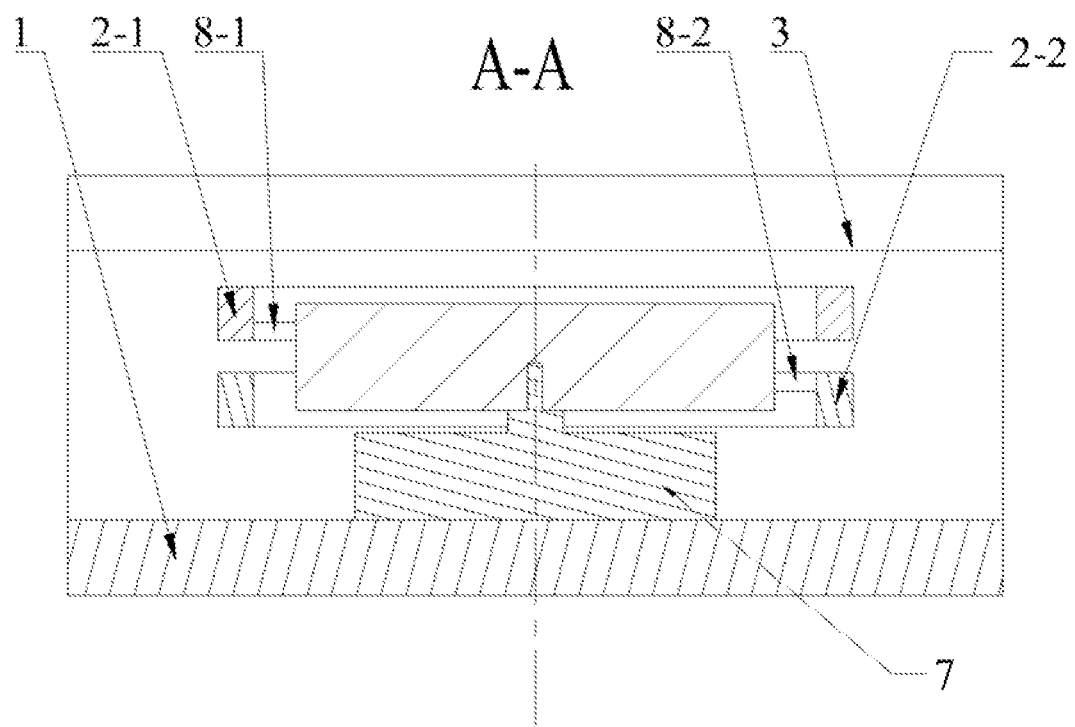

FIG. 2: A half-sectional view of the electromagnetic apparatus.

Figure 3:
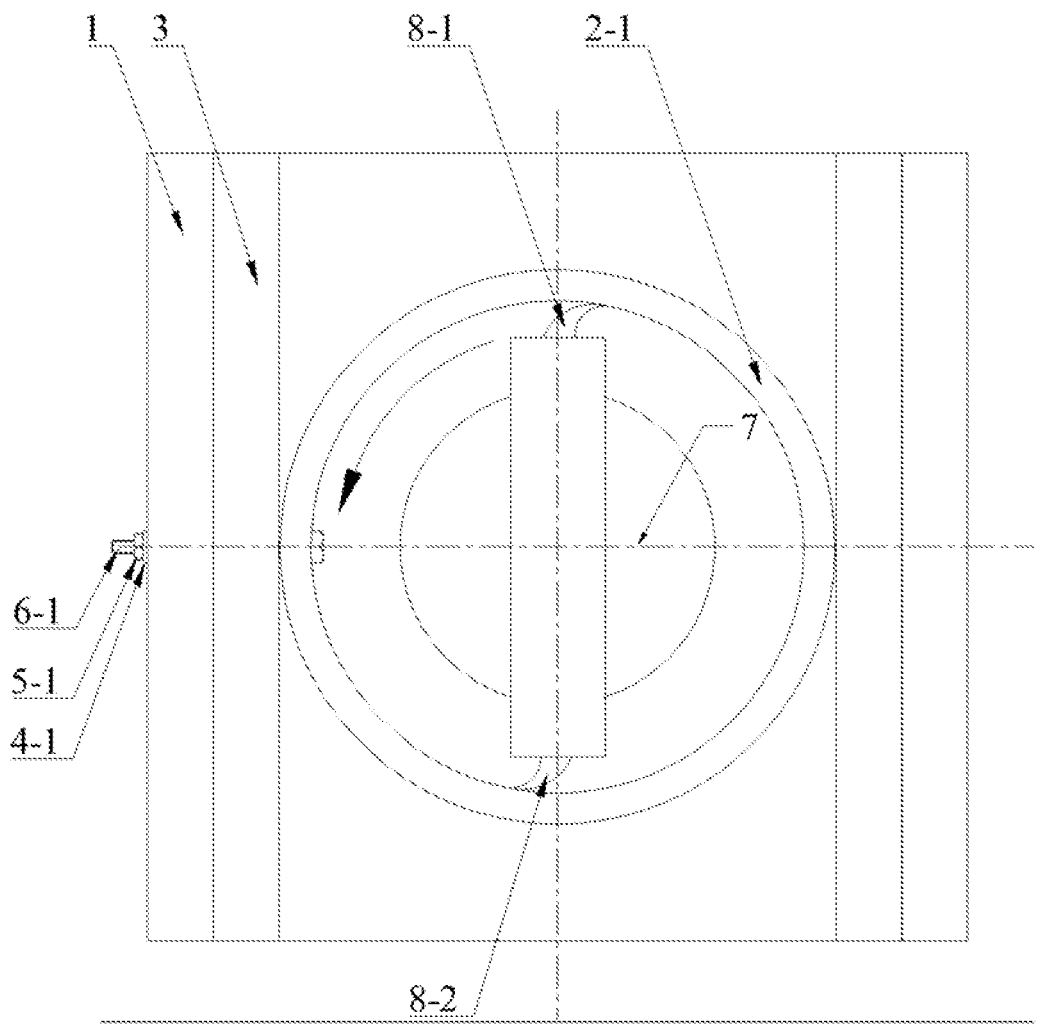

FIG. 3: A top view of the electromagnetic apparatus. A metal rod is placed horizontally between the two metal rings and comes in electrical contact with each of the two metal rings through a respective elastic metal sheet.

In the drawing, 7 motor.

Figure 4:
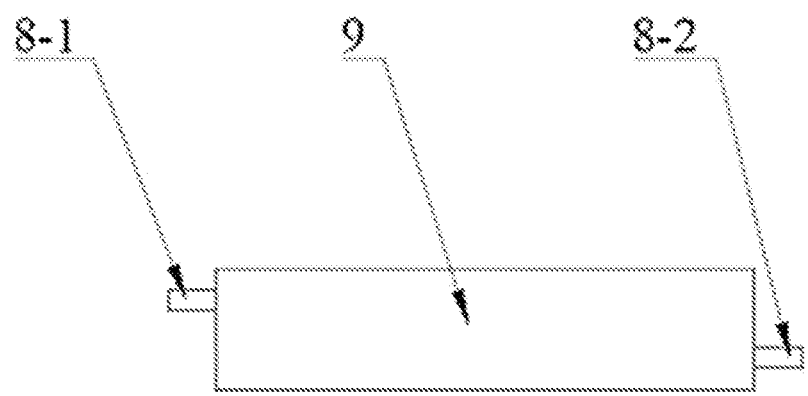

FIG. 4: A schematic diagram of key parts.

In the drawing, 8-1, 8-2 elastic metal sheet; 9 metal rod.

Figure 5:
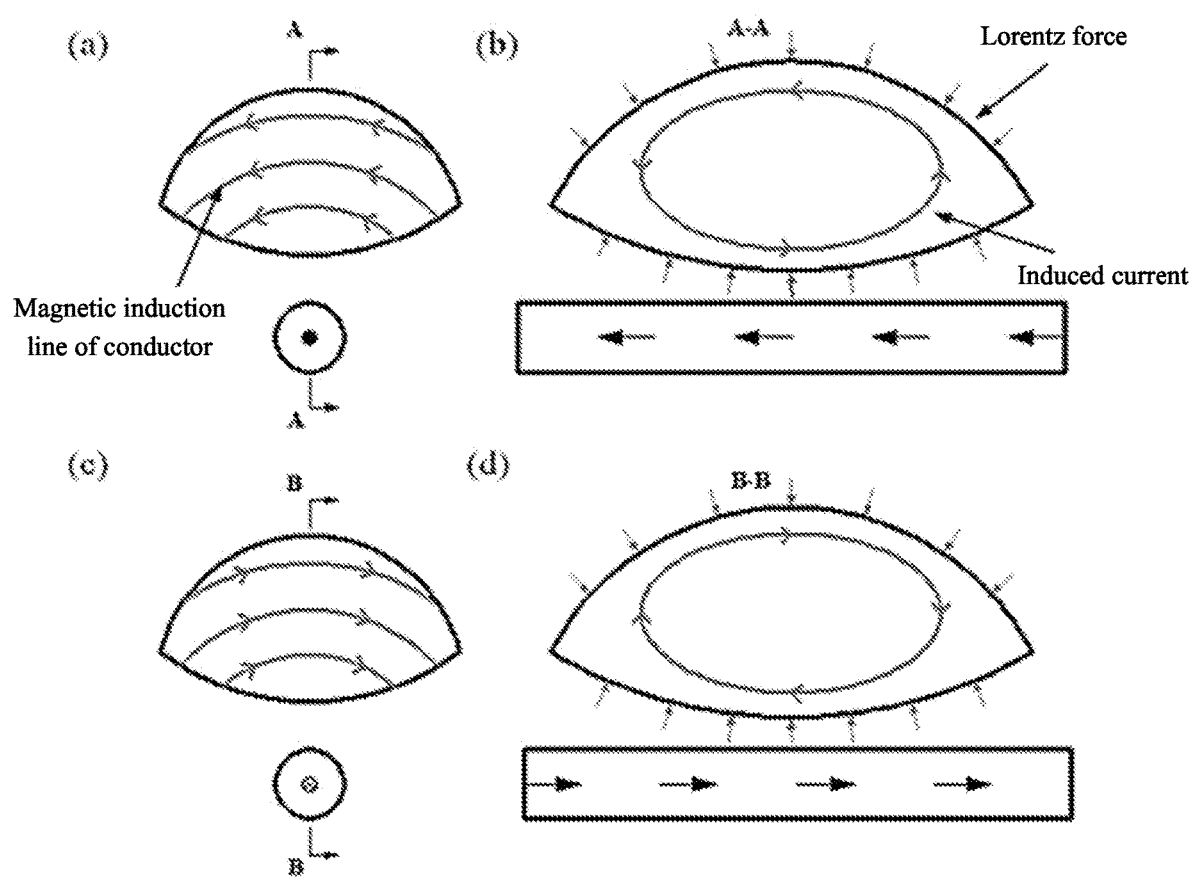

FIG. 5: A schematic diagram of Lorentz force distribution in a molten pool.

In the drawing, (a) cross section of the molten pool in 0-½ cycle, (b) longitudinal section of the molten pool in 0-½ cycle, (c) cross section of the molten pool in ½-1 cycle, and (d) longitudinal section of the molten pool in ½-1 cycle.

DETAILED DESCRIPTION OF THE EMBODIMENTS

To better illustrate the implementation details of the present invention, the electromagnetic apparatus for active intervention to a shape of a molten pool according to the present invention will be described in detail below regarding FIG. 1.

The electromagnetic apparatus for active intervention to a shape of a molten pool according to the present invention includes a test bench 1, metal rings 2-1 and 2-2, spacers 4-1 and 4-2, nuts 5-1 and 5-2, conductive bolts 6-1 and 6-2, a motor 7, elastic metal sheets 8-1 and 8-2, and a metal rod 9. Each of the metal rings 2-1 and 2-2 is fixed to the insulated test bench 1 by a respective one of the conductive bolts 6-1 and 6-2, a respective one of the spacers 4-1 and 4-2, and a respective one of the nuts 5-1 and 5-2, and an end of each of the conductive bolts 6-1 and 6-2 penetrates one side of the test bench 1 and serves as an external conductive interface. The metal rod 9 has an axial center located on the same vertical line as the centers of the two metal rings 2-1 and 2-2, and is connected to the motor 7. The motor 7 is located at a bottom of the test bench, and has a center located on the same vertical line as the centers of the metal rings 2-1 and 2-2. The metal rod 9 comes in contact with each of the upper and lower metal rings 2-1 and 2-2 through a respective one of the elastic metal sheets 8-1 and 8-2 at both ends. An external AC power source is connected to the ends of the conductive bolts 6-1 and 6-2 by double U-shaped wires, forming a whole closed circuit. Two stepped surfaces are milled symmetrically on an upper surface of the test bench, and a workpiece can be placed horizontally on the two stepped surfaces for electromagnetic intervention processing. Upon power on, the metal rod rotates to generate a toroidal magnetic field centered on the metal rod, and the toroidal magnetic field acts on the molten pool to generate an induced current. The induced current generates Lorentz force under the action of the magnetic field, which acts perpendicularly on an outer surface of the molten pool, thereby changing the height, depth and width of the molten pool, and finally realizing the active intervention to the molten pool shape.

The electromagnetic apparatus for active intervention to a shape of a molten pool is characterized in that the workpiece is placed on the stepped surfaces of the test bench, and upon power on, the metal rod rotates to generate a toroidal magnetic field centered on the metal rod, and the toroidal magnetic field acts on the molten pool to generate an induced current, and the induced current generates Lorentz force under the action of the magnetic field, which acts perpendicularly on the outer surface of the molten pool, thereby changing the height, depth and width of the molten pool, and finally realizing the active intervention to the molten pool shape.

Embodiment 1

A Model YLS-2000-TR laser is used to clad an IN718 coating on the surface of the IN718 alloy. The main processing parameters include a spot diameter of 2 mm, a laser power of 1000 W, a scanning speed of 500 mm/min, and a powder feed rate of 0.3 g/min. With the electromagnetic apparatus off, a 40 mm-long single-channel coating is clad. Then, the electromagnetic apparatus is turned on, with a motor speed of 3,000 r/min, and an alternating current of 100 A, 300 A and 600 A. After the laser cladding, the pool width, height and depth of the cross section are measured, and the dilution rate and aspect ratio are calculated, as shown in Table 1. It can be found from Table 1 that as the intensity of the alternating current increases, the dilution rate and the aspect ratio are improved significantly, which means that the coating bonding strength and quality are improved.

TABLE 1

Summary of cladding layer shape data

| Current (A) | Width (mm) | Height (mm) | Depth (mm) | Dilution rate % | Aspect ratio |
|---|---|---|---|---|---|
| 0 | 2.254 | 1.325 | 2.224 | 0.627 | 0.635 |
| 100 | 2.523 | 1.02 | 1.568 | 0.606 | 0.975 |
| 300 | 3.254 | 0.803 | 0.875 | 0.521 | 1.939 |
| 600 | 3.654 | 0.547 | 0.235 | 0.301 | 4.673 |

Embodiment 2

A Model YLS-2000-TR laser is used to carry out laser melting on the surface of IN718 alloy. The main processing parameters include a spot diameter of 2 mm, a laser power of 1,000 W, and a scanning speed of 500 mm/min. With the electromagnetic apparatus off, a 40 mm-long single-channel coating is clad. Then, the electromagnetic apparatus is turned on, with a motor speed of 3,000 r/min, and an alternating current of 100 A, 300 A and 600 A. After the laser cladding, the pool width of the cross section is measured, as shown in Table 2. It can be found from Table 2 that the width of the molten pool tends to increase as the intensity of the alternating current increases. At a current of 600 A, the pool width is increased by 88.12%, effectively increasing the single melting area and improving the production efficiency.

TABLE 2

Summary of melting shape data

| Current (A) | Width (mm) |
|---|---|
| 0 | 1.524 |
| 100 | 2.124 |
| 300 | 2.365 |
| 600 | 2.867 |

What is claimed is:

1. An electromagnetic apparatus for active intervention to a shape of a molten pool, comprising:
an insulated test bench, two metal rings, two conductive bolts, a motor and a conductive metal rod, wherein
an upper metal ring of the two metal rings and lower metal ring of the two metal rings are fixed to the insulated test bench by the two conductive bolts, respectively, and an end of each of the two conductive bolts penetrates a side of the insulated test bench and the end of each of the two conductive bolts serves as an external conductive interface;
the conductive metal rod is placed horizontally between the two metal rings and the conductive metal rod is in electrical contact with each of the two metal rings through two elastic metal sheets, respectively, and the conductive metal rod is connected to the motor;
the motor is located at a bottom of the insulated test bench;
an external AC power source is connected to the end of each of the two conductive bolts by double U-shaped wires, to form a whole closed circuit;
two stepped surfaces are milled symmetrically on an upper surface of the insulated test bench, and a workpiece is placed horizontally on the two stepped surfaces for electromagnetic intervention processing;
upon power on, the conductive metal rod rotates to generate a toroidal magnetic field centered on the conductive metal rod, and the toroidal magnetic field acts on the molten pool to generate an induced current; and
the induced current generates a Lorentz force under an action of the toroidal magnetic field, and the Lorentz force acts perpendicularly on an outer surface of the molten pool, to change a height, a depth and a width of the molten pool, and to implement the active intervention to the shape of the molten pool.

2. The electromagnetic apparatus according to claim 1, wherein
the two conductive bolts are fixed to the side of the insulated test bench by nuts and spacers, respectively.

3. The electromagnetic apparatus according to claim 1, wherein
an axial center of the conductive metal rod and centers of the two metal rings are located on a vertical line.

4. The electromagnetic apparatus according to claim 1, wherein
a center of the motor and centers of the two metal rings are located on a vertical line.

5. The electromagnetic apparatus according to claim 1, wherein
the conductive metal rod is in contact with each of the upper metal ring and the lower metal ring through the two elastic metal sheets at both ends of the conductive metal rod, respectively.

6. The electromagnetic apparatus according to claim 1, wherein
the conductive metal rod is installed on the motor and rotates the upper metal ring and the lower metal ring at a rotational speed of 3,000 r/min; the upper metal ring and the lower metal ring are parallel to each other; and the external AC power source provides an alternating current of 0-1,000 A and 50 HZ.

* * * * *